United States Patent
Inoue

(10) Patent No.: US 6,449,390 B1
(45) Date of Patent: *Sep. 10, 2002

(54) IMAGE PROCESSING APPARATUS AND METHOD THEREFOR

(75) Inventor: Hitoshi Inoue, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,287

(22) Filed: Sep. 15, 1998

(30) Foreign Application Priority Data

Sep. 24, 1997 (JP) .............................. 9-258753
Apr. 3, 1998 (JP) ........................... 10-091713

(51) Int. Cl.[7] .................................................. G06K 9/00
(52) U.S. Cl. ....................................... 382/168; 382/169
(58) Field of Search ................................ 382/168, 169, 382/170, 171, 172; 358/521, 522

(56) References Cited

U.S. PATENT DOCUMENTS

| | | | |
|---|---|---|---|
| 4,950,894 A | 8/1990 | Hara et al. | |
| 5,253,281 A | 10/1993 | Krauss | |
| 5,410,418 A | * 4/1995 | Yonezawa | ............... 358/456 |

FOREIGN PATENT DOCUMENTS

| | | | |
|---|---|---|---|
| FR | 2 700 230 A1 | 7/1994 | |
| JP | 06 054257 A | 2/1994 | .......... H04N/5/325 |

OTHER PUBLICATIONS

Patent Abstracts of Japan, vol. 096, No. 006, Jun. 28, 1996 & JP 08 032827 A (Toppan Printing Co. Ltd.), Feb. 2, 1996.
Patent Abstracts of Japan, vol. 014, No. 322 (C–0739), Jul. 10, 1990 & JP 02 114931 A (Toshiba Corp.), Apr. 27, 1990.
A copy of a communication from the European Patent Office (dated Aug. 28, 2001) received in counterpart application serial No. 98 117 922.9–1524.

* cited by examiner

Primary Examiner—Phuoc Tran
(74) Attorney, Agent, or Firm—Morgan & Finnegan, L.L.P.

(57) ABSTRACT

The present invention discloses an image processing apparatus and an image processing method for varying the gradation characteristics of the image, by inputting an image signal, detecting the histogram distribution characteristics of pixel values constituting the image represented by the inputted image signal and converting the detected histogram characteristics into arbitrary histogram characteristics. Thus the gradation characteristics of plural images obtained from a same portion of the object can be converted into desired gradation characteristics, and the gradation characteristics of an image obtained by a substrate image processing apparatus can be converted close to the gradation characteristics of the taken original images, whereby the deterioration in the efficiency of diagnosis can be prevented.

25 Claims, 11 Drawing Sheets

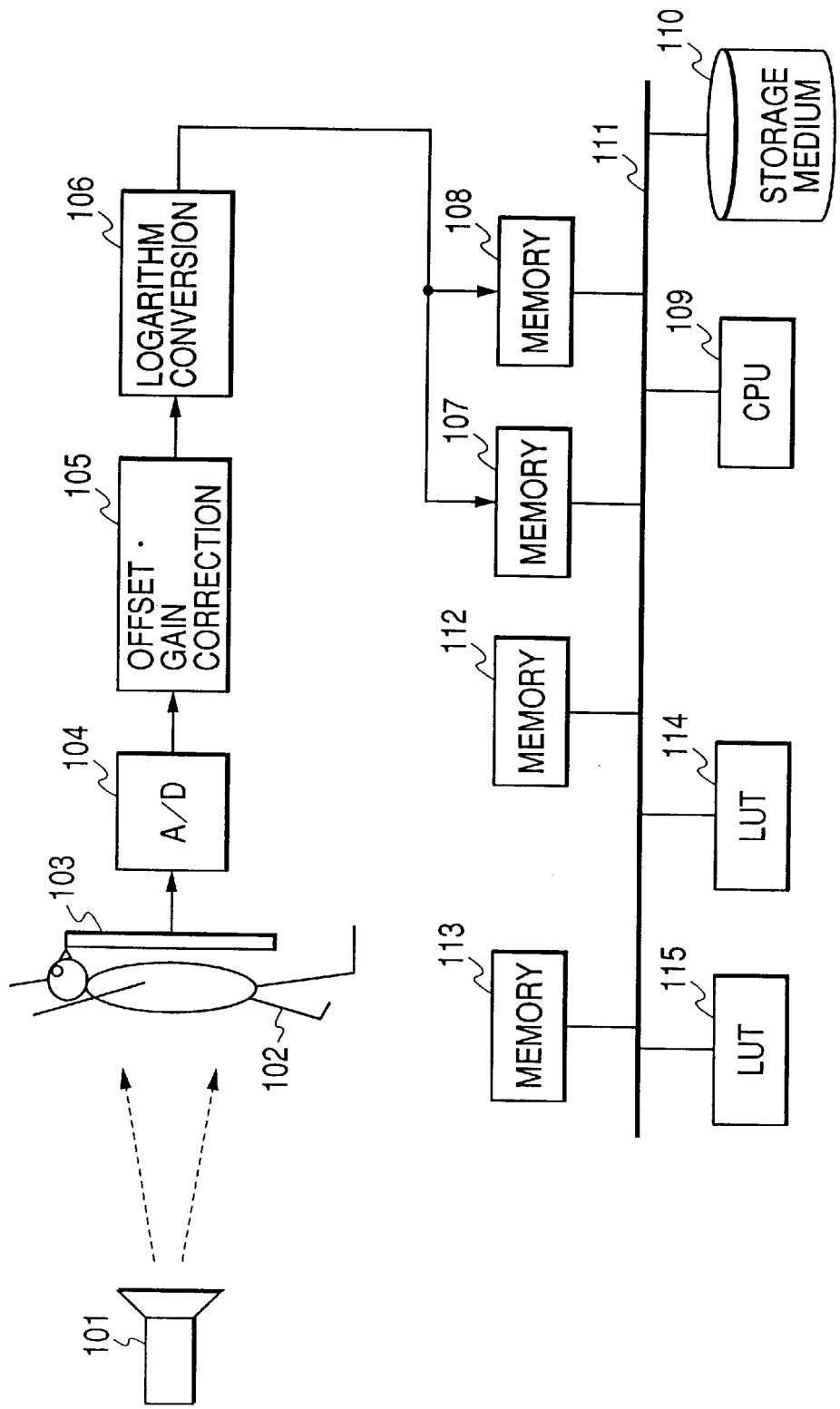

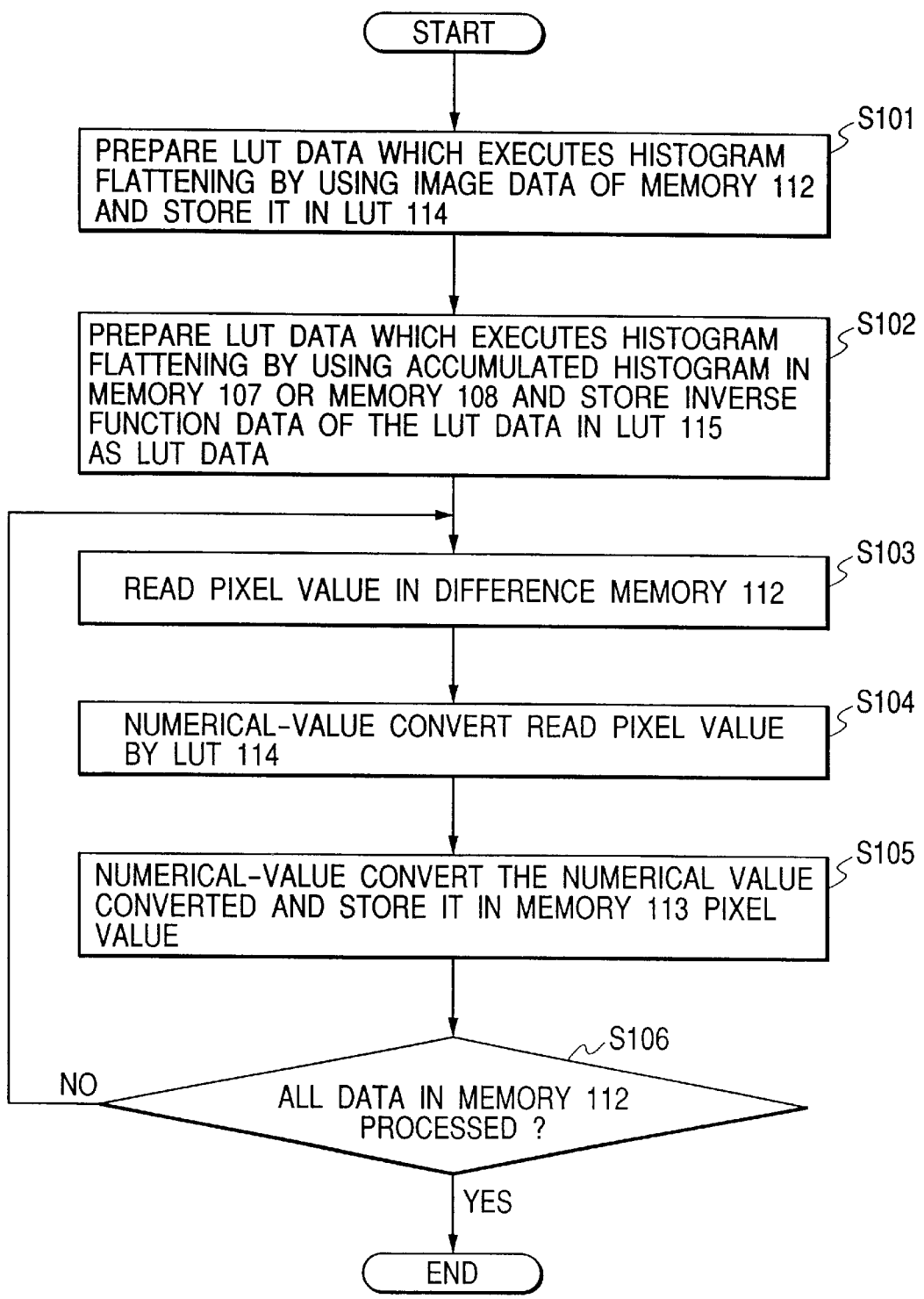

IMAGE PROCESSING APPARATUS AND METHOD THEREFOR

BACKGROUND OF THE INVENTION

1. Field of the Invention

The present invention relates to an image processing apparatus and an image processing method adapted for use in an image processing apparatus for converting the gradation characteristics of plural images taking a same portion of an object, and more particularly to an image processing apparatus and an image processing method adapted for use, for example in the medical radiology field or the like, in a subtraction image processing apparatus for processing plural radiological images obtained by radiological image takings of an object under different image taking conditions.

2. Related Background Art

The X-ray radiological images for medical purpose have long been obtained by converting the intensity distribution of X-ray transmitted by the human body into the intensity distribution of fluorescent light of a fluorescent member and recording such light intensity distribution directly on a silver halide-based film, but, in recent years, the radiological images are being read in the form of electrical signals by a method of forming and reading a latent energy image representing the X-ray intensity distribution in a photostimulable fluorescent member, a method of directly reading the distribution of fluorescent light generated on a fluorescent member by X-ray or a method not depending on the fluorescent light, and a digital image is obtained by digital conversion of such electrical signals.

The use of such digital image allows to improve the efficiently of filing, to implement remote diagnosis, and to achieve improvements in the diagnostic technologies and efficiency. In addition, such digital image enables various image processing, thus realizing various changes in the method of diagnosis.

Among such image processing, most common is the gradation processing. As an example, a regular conversion of the pixel values within the image allows to enhance a pattern that is not easily recognizable in the original image, into a more easily recognizable form. Also even in case the condition of radiological image taking is inappropriate or unstable, the image that would be unusable on the conventional X-ray film can be rectified to stable gradation characteristics by appropriate gradation processing.

Among such gradation processing, the averaging of histogram (frequency distribution of pixel values) is simplest and most commonly employed, but this method may be unsuitable for diagnostic purpose since it only executes straight-forward averaging by broadening concentrated portions of the frequency distribution of the pixel values in the entire image and narrowing or uniting less dense portions of the frequency distribution. The image used for diagnosis has been developed over a long history based on the conventional silver halide-based X-ray film, and, for the radiologists, the gradation characteristics (appearance of image) similar to those of the conventional X-ray film are better for the efficiency and accuracy of diagnosis. More specifically, the histogram of the image of the conventional silver halide-based X-ray film is naturally not flat but characteristically describes the area of disease by the image taking technology developed over many years, and the radiologists have been so trained as to identify the diseases based on such form of image presentation.

It is therefore desired, also in the gradation processing of the digital image, to effect conversion into such image enabling easy diagnosis in stable manner. Such objective has been attained by processing the image, obtained by a digital image taking device with characteristics significantly different from those of the conventional silver halide-based film, through a considerably complex process including empirical methods, but a first drawback lies in a fact that such process inevitably involves a generally very long processing time and cumbersome operations.

A large advantage of image digitization lies in the ease of filing and retrieval of the image. For example, it is rendered possible to promptly investigate the change in the disease in a same patient by retrieving and comparing the image filed in the past. If the image taken in the past was obtained under different image taking conditions, the difference in such image taking conditions can be canceled by applying a gradation processing. However, there is encountered a second drawback that a cumbersome process is required for substantially matching the gradation of the past image with that of the current image.

Also in case of obtaining an image corresponding to the distribution of transmittance for a radiation such as X-ray thereby showing the internal structure of an object, there are conventionally been known so-called energy subtraction process of utilizing two radiations of different energy distributions to obtain two images corresponding to the distribution of transmittance, based on a fact that a specified constituent in the interior of the object has specific radiation transmittance (or absorbing characteristics for the energy of radiation), then digitizing these images and effecting a calculation between these images to extract or erase the specified constituent in the interior of the object. In the processing of medical X-ray images, such process is considered extremely useful for diagnostic purpose, such as erasure or extraction of a bone portion.

FIG. 1 shows a conventional energy subtraction apparatus, in which provided are a tube 101 for generating X-ray; a human body 102 constituting the object; a CCD 103 constituting a solid-state image pickup device for separating the distribution of radiation into pixels thereby obtaining an electrical signal; an A/D converter 104 for converting an analog electrical signal into digital values; an offset/gain correction unit 105 for correcting the fluctuation in the offset-gain of the CCD 103; a logarithmic conversion unit 106 for converting digital values, proportional to the obtained radiation intensity, into logarithmic values; memories 107, 108 serving to store the image data and connected to a signal bus 111; a central processing unit (CPU) 109 capable of access to the memories 107, 108 through the bus 111; and a program memory medium 110 such as a FD, a HD or a MOD in which the process sequence is stored as a program. The final image obtained after energy subtraction is stored in a memory 112 connected to the bus 111.

In the following there will be explained the function of the apparatus described above. At first the X-ray tube 101 emits X-ray with a first energy distribution, and the obtained image is converted in the CCD 103 into an electrical signal, which is converted by the A/D converter 104 into digital values. After the correction in the offset/gain correction unit 105 and the conversion into values corresponding to logarithmic values in the logarithmic conversion unit 106, the digital values are once stored in the memory 107. Then the X-ray tube 101 emits the X-ray with a second energy distribution, and the image obtained by logarithmic conversion in a similar process is stored in the memory 108.

Then considered is a pixel in the logarithmically converted two images obtained in the above-described manner, and such pixel is assumed to receive X-ray that has transmitted a bone and a soft tissue in the human body.

In the first energy distribution, the intensity $H_1$ of transmitted radiation is given by:

$$H_1 = I_1 \exp(-\mu_1 t_1) \exp(-\mu_2 t_2) \tag{1}$$

wherein $\mu_1$, $\mu_2$ are radiation transmittances of respectively bone and soft tissue, $t_1$, $t_2$ are thicknesses thereof, and $I_1$ is the intensity of first incident radiation in this portion.

Similarly the intensity $H_2$ of transmitted radiation in the second energy distribution is given by:

$$H_2 = I_2 \exp(-\mu'_1 t_1) \exp(-\mu'_2 t_2) \tag{2}$$

wherein $\mu'_1$, $\mu'_2$ are radiation transmittances of respectively bone and soft tissue, $t_1$, $t_2$ are thicknesses thereof, and $I_2$ is the intensity of second incident radiation in this portion.

As digital data proportional to these logarithmic conversions are stored as pixel values, the corresponding pixel data $h_1$, $h_2$ are given by:

$$h_1 = K(\mu_1 t_1 + \mu_2 t_2) + C_1 \tag{3}$$

$$h_2 = K(\mu'_1 t_1 + \mu'_2 t_2) + C_2 \tag{4}$$

wherein K, $C_1$ and $C_2$ are constants.

These equations (3) and (4) are considered as simultaneous equations, and, if the transmittances or the ratio thereof is known, the thickness $t_1$ of the bone and that $t_2$ of the soft tissue can be obtained as sums with a constant offset value. Since such offset value is substantially constant over the entire image, a suitable offset value is added or the image is inverted in order to render the image more visible or to eliminate negative pixel data, and the energy subtraction image thus obtained is stored in the memory 112.

It is naturally possible also to obtained images under plural conditions instead of two conditions, and to suitably process such plural images to obtain a single image in which one or plural portions are erased or enhanced.

The diagnosis with the X-ray image has a long history, and, based on the experience in such history, the radiologists are accustomed to the ordinary image density distribution specific to the human body and are trained for diagnosis utilizing such distribution. Consequently the image obtained by energy subtraction, for example showing soft tissues such as blood vessels or tumor only by erasure of the bones, is merely the solution of the simultaneous equations (3) and (4) and is different from the original X-ray transmittance. Therefore the gradation characteristics of the image are different from those to which the radiologists are used, and the efficiency of diagnosis may be deteriorated.

Furthermore, the image obtained by energy subtraction shows different gradation characteristics based on the image taking conditions (two X-ray energy distributions), so that stable gradation independent of the image taking condition cannot be obtained by mere correction of the offset.

SUMMARY OF THE INVENTION

An object of the present invention is to provide an image processing apparatus and an image processing method capable of solving the above-described drawbacks.

Another object of the present invention is to provide an image processing apparatus and an image processing method capable of converting the gradation characteristics of plural images taking a same part of the object into an image with desired gradation characteristics in a simple manner.

The above-mentioned objects can be attained, according to an embodiment of the present invention, by an image processing apparatus capable of varying the gradation characteristics of image, comprising histogram distribution characteristic detecting means for inputting an image signal and detecting the histogram distribution characteristic of the pixel values constituting the image represented by the inputted image signal, and histogram distribution characteristic converting means for converting the histogram distribution characteristic, detected by the histogram distribution characteristic detecting means, into an arbitrary histogram distribution characteristic.

Still another object of the present invention is to provide an image processing apparatus and an image processing method, capable of converting the gradation characteristics of an image obtained by a subtraction image processing apparatus so as to be similar to the gradation characteristics of the originally taken image.

The above-mentioned object can be attained, according to an embodiment of the present invention, by an image processing apparatus for processing plural images obtained under mutually different image taking conditions, comprising differential image signal generating means for inputting plural image signals corresponding to plural images obtained under mutually different image taking conditions and generating a differential image signal corresponding to a differential image of the images represented by the inputted plural image signals, and histogram distribution characteristic converting means for inputting the differential image signal generated by the differential image signal generating means and converting the histogram distribution characteristic of the pixels values, constituting the differential image represented by the inputted differential image signal, into an arbitrary histogram distribution characteristic.

Still other objects of the present invention, and the features thereof, will become fully apparent from the following detailed description of the embodiments, which is to be taken in conjunction with the attached drawings.

BRIEF DESCRIPTION OF THE DRAWINGS

FIG. 10 is a block diagram of an embodiment of the second invention; and

FIG. 11 is a flow chart showing the functions of the embodiment shown in FIG. 10.

DETAILED DESCRIPTION OF THE PREFERRED EMBODIMENTS

In the following there will be explained embodiments of a first invention, with reference to attached drawings.

At first there will be explained the principle of the image processing method of the first invention.

In a first step in this method, there is prepared a gradation conversion table for flattening the histogram of a standard image, and an inverse conversion table therefor is prepared.

In a next step, there is prepared a gradation conversion table for flattening the histogram of an arbitrary general image, and the image is subjected to gradation conversion with such gradation conversion table. In this step the histogram of the arbitrary general image is flattened.

In a final step, the arbitrary general image with thus flattened histogram is subjected to gradation conversion with the above-mentioned inverse conversion table for the standard image.

This three-step method allows to convert the histogram of the arbitrary general image to a gradation substantially same as the histogram of the standard image.

The histogram of a digital image is obtained by a frequency distribution of pixel values x of the image within an entire image or a part thereof. By representing the histogram with f(x), the histogram flattening method is to so deform f(x) as to obtain an approximately uniform density of distribution. Such flattening of histogram is realized by passing the image data through a gradation conversion table H(x) showing in the following:

$$H(x) = \frac{\sum_{i=M0}^{x} f(i)}{\sum_{i=M0}^{M1} f(i)} (M1 - M0) + M0, \quad M0 \le x \le M1 \tag{5}$$

wherein M0 and M1 are respectively the minimum and maximum values of the digital data, in which the depth (number of bits) of the input digital data is selected same as that of the output digital data (for example in the ordinary 12-bit data, M0=0 and M1=4095). It can be easily estimated that such gradation conversion table H(x) can convert the gradation of the original image with a histogram f(x) to an approximately flat density of distribution.

The above-described first step prepares a histogram flattening gradation conversion table $H_0(x)$ from the histogram $f_0(x)$ of a standard image, utilizing the equation (5), and then prepares an inversion conversion table $H_0^*(x)$. Since $H_0(x)$ is generally not an analytically determined function, the inverse conversion table $H_0^*(x)$ which is an inverse function cannot be determined in an analytical mannet, but a conversion table providing an inverse relationship between the input and the output can be easily determined through a simple routine program. Otherwise it is also possible to approximate H(x) with an analytical function (for example by least square method) and to analytically approximate H*(x).

Figure 2:
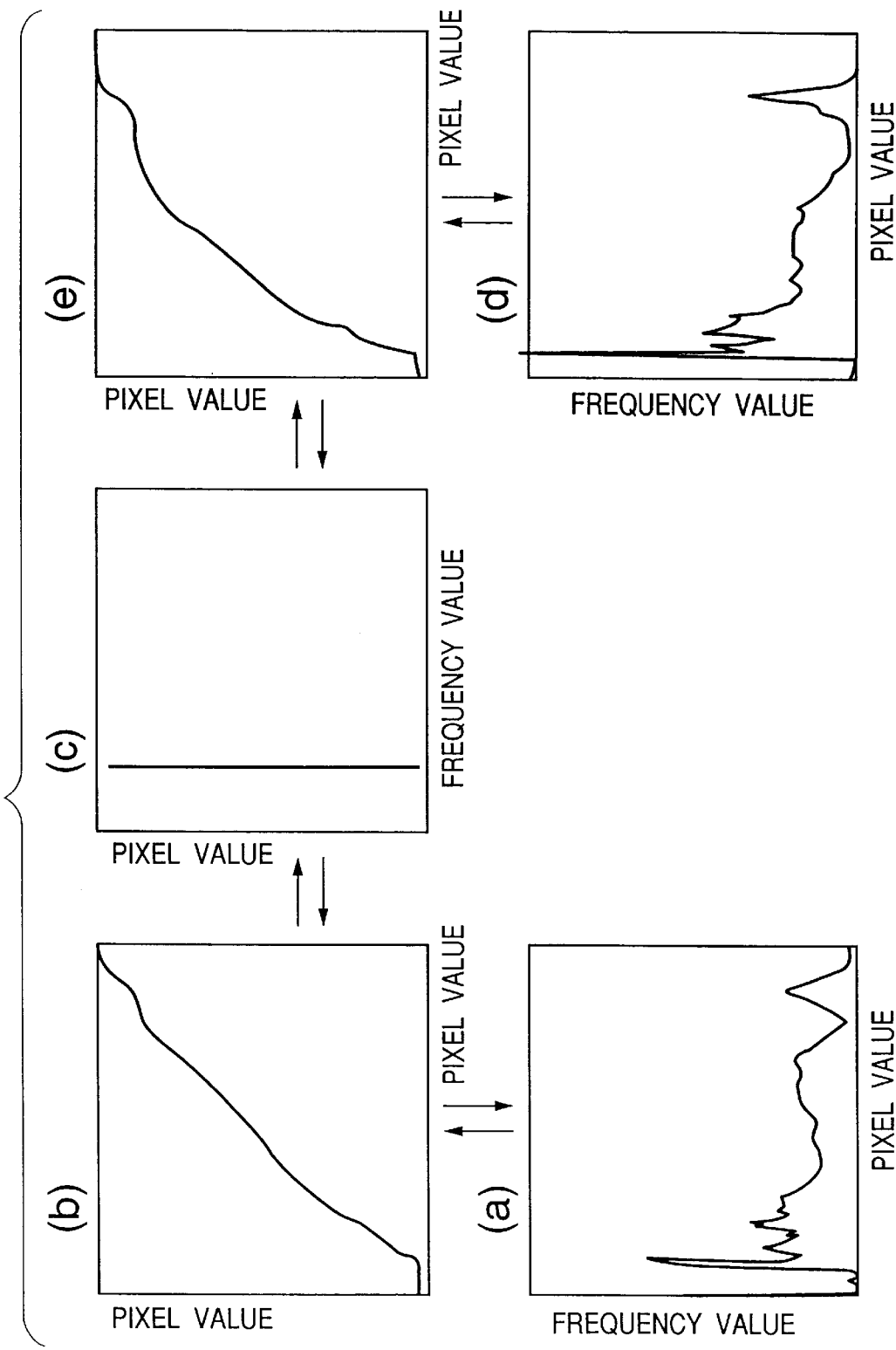
FIG. 2 is a characteristic charts showing the principle of a first invention.

The inverse conversion table $H_0^*(x)$ thus determined evidently has a function of converting an image with a flattened histogram into an image having a histogram similar to that of the standard image. This situation is illustrated in FIG. 2, in which (a) indicates the histogram $f_0(x)$ of the standard image, with the pixel values in the abscissa and the frequency in the ordinate. In FIG. 2, (b) shows a gradation conversion table $H_0(x)$ for flattening the histogram, in which the abscissa indicates the input and the ordinate indicates the output, while (c) schematically shows a flattened histogram of an output image, obtained by passing the image of the histogram (a) through the conversion table of the input-output characteristics (b).

The flow (a)→(b)→(c) shown in FIG. 2 can be traced in the inverse order so that a conversion (c)→(b)→(a) is also possible (though such conversion is not completely reversible since some information is inevitably lost in the conversion with the table of a limited number of gradation level). In such inverse conversion, (b) corresponds to the inverse function $H_0^*(x)$ in which the ordinate indicates the input and the abscissa indicates the output.

In the above-described second step, an arbitrary general image of a histogram different from that of the standard image is subjected to the flattening of histogram also according to the equation (5). More specifically, this step prepares a histogram flattening gradation conversion table $H_1(x)$ from the histogram $f_1(x)$ of another image, utilizing the equation (5), as shown in FIG. 2, in which (d) indicates the histogram $f_1(x)$, with the pixel values in the abscissa and the frequency in the ordinate. In FIG. 2, (e) shows a histogram flattening gradation conversion table $H_1(x)$, in which the abscissa indicates the input and the ordinate indicates the output, while (c) shows a histogram flattened as a result.

In the final step mentioned in the foregoing, as the image of the flattened histogram (c) is converted through the table $H_0^*(x)$ shown in (b), it will be easily understood that an image having the standard histogram (a) can be obtained as the result of such conversion.

In the foregoing explanation, it is to be noted that, since the image consists of discrete digital values, the histogram is not made completely flat but only shows an approximately constant density in general sense, so that the histogram of the final image obtained through the above-described three steps does not completely coincide with the histogram of the standard image. However, the images will be recognized, by the human eyes, to have substantially coinciding characteristics if the histograms mutually match in general sense.

In the following there will be explained first to sixth embodiments of the first invention, based on the principle described above.

At first there will be explained first to third embodiments, which are to solve the aforementioned drawbacks and realize a gradation processing for matching the histogram of an arbitrary image with that of the standard image by a simple process, utilizing an image, which has been subjected to the conversion of the gradation to a state suitable for diagnosis, as the standard image and also utilizing a fact that the frequency distribution (histogram) of an image so processed as to be suitable for diagnosis remains substantially same for a given photographed portion of the human body.

Now there will be explained the first embodiment.

Figure 3:
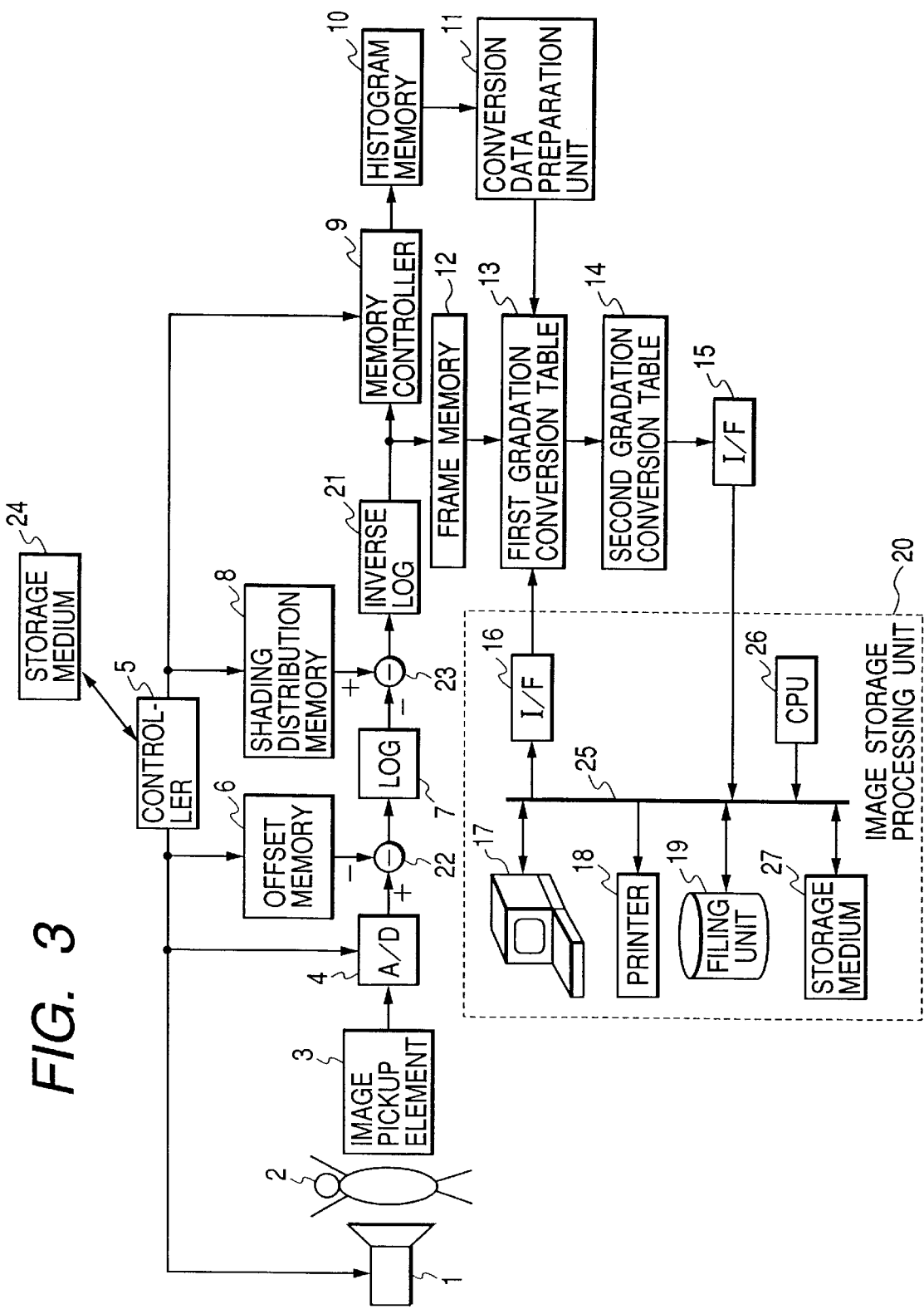
FIG. 3 is a block diagram of a first embodiment of the first invention.

FIG. 3 is a block diagram of an X-ray image reading system embodying the present invention, wherein provided are an X-ray generating device 1; a human body 2 constituting the object; an image pickup element 3 for converting the intensity distribution of X-ray into an electrical signal; an A/D converter 4 for converting the output of the image pickup element 3 into digital values; an offset memory 6 for correcting the fluctuation in the dark output of the image pickup element 3; a logarithmic converter 7 for effecting a logarithmic conversion for an ensuing dividing operation; a shading distribution memory 8 for correcting the fluctuation in the gains of the image pickup element 3 or in the distribution of X-ray radiation; and an inverse logarithmic converter 21 for applying, in a final step of dividing operation, an inverse logarithmic conversion to the logarithmically converted pixel data thereby obtaining values linear to the X-ray intensity.

A controller 5 including a CPU for controlling the entire image fetching process is connected to various blocks of the image fetching unit and controls the image fetching in synchronization with the generation of X-ray by the X-ray generating device 1. Besides, it is also connected to the converters and the gradation conversion tables though connections are omitted in FIG. 1, and effects control according to a program stored in a memory medium 24. The memory medium 24 storing the program can for example be a ROM, a FD, a CD-ROM, a HD, a memory card or a magnetooptical disk.

There are further provided a memory controller 9 for automatically preparing the histogram; a histogram memory 10 for storing the histogram of the image; a frame memory 12 for temporarily storing the acquired image; a first gradation conversion table 13 which stores histogram flattening conversion data prepared by a conversion data preparation unit 11; a second gradation conversion table 14 which stores gradation conversion data prepared by the controller; an interface 15 for outputting the image data to the exterior; and subtractors 22, 23.

A broken-lined area 20 is an external image storage processing unit for processing the storage of image, in which provided are a filing unit 19 for filing the image data; an operation console 17 including an image monitor; a printer 18 for printing the image on a film etc; an interface 16 for re-writing the gradation conversion table 13 according to the result of processing in the image storage processing unit 20; and a bus 25.

A central process unit (CPU) 26 controls the entire system according to a program stored in a memory medium 27, which can for example be a ROM, a FD, a CD-ROM, a HD, a memory card or a magnetooptical disk.

In the following there will be explained the functions of the system. At first the controller 5 fetches the dark output of the image pickup element 3 while the X-ray is not generated from the X-ray generating device 1, and converts such output into a digital value in the A/D converter 4 and stores the digital value in the offset memory 6. Then the X-ray is generated in the absence of the object 2, thereby fetching the distribution of the X-ray radiation, and, after the subtraction of the above-mentioned dark output in the subtractor 22, the distribution is logarithmically converted in the logarithmic converter 7 and is stored in the shading distribution memory 8.

Then the standard image is prepared in the following manner. Prior to fetching of the image, all the addresses of the histogram memory 10 are cleared to zero. Then the X-ray is generated in the presence of the object 2 between the X-ray generating device 1 and the image pickup element 3, and the image pickup element 3 converts the distribution of X-ray intensity into an electrical signal. The electrical signal is converted into digital values (read pixel values), and the dark outputs of the corresponding positions are read from the offset memory 6 and are respectively subtracted from the read pixel values. Then thus subtracted read pixel values are subjected to logarithmic conversion, and the X-ray radiation distribution of the corresponding positions is read from the shading distribution memory 8 and subtracted in the subtractor 23. The obtained data are subjected to inverse logarithmic conversion, and are once stored in the frame memory 12. These data are pixel data representing the internal structure of the object 2, after correction for the fluctuation in the image pickup element 3 and for the distribution of the X-ray radiation.

Simultaneous with the above-described operations, in the course of reading of the pixel data, the memory controller 9 stepwise increases the value of the histogram memory 10 at an address corresponding to the value of the read pixel data.

Consequently, when all the image data are fetched into the frame memory 12, the histogram of the image is automatically stored in the histogram memory 10. As the flattening of histogram is not executed in this fetching of the standard image, the gradation conversion table 13 stores linear data in which input:output=1:1 and the above-described histogram is not particularly utilized. Also linear 1:1 data are stored in the gradation conversion table 14 since this table is not particularly employed. The image data thus obtained are outputted to the external image storage processing unit 20 through the interface 15 and are filed in the filing unit 19.

After fetching an image through the above-described operations, the operator manually executes a gradation process, by the operation console 17 of the image storage processing unit 20, in such a manner that the diseased portion of the object patient is described characteristically, or that the output result of the printer 18 matches the characteristics of the conventional silver halide-based film or characteristically describes the diseased portion or matches the taste of the radiologist, and such image is registered as the standard image. Subsequently the histogram of such standard image (a) in FIG. 2 is prepared according to the equation (5), then the gradation conversion table for histogram flattening (b) in FIG. 2 is prepared through the interface 16, and the inverse conversion table therefor is prepared and written in the second gradation conversion table 14.

In the following there will be explained a case of histogram conversion by fetching an image showing a same portion as that of the standard image, utilizing thus prepared inversion conversion table on the standard image.

The procedure in this case is substantially same as that explained in the foregoing, except that, after the image fetching, the conversion data preparation unit 11 automatically prepares a histogram flattening gradation conversion table (e) in FIG. 2 according to the equation (5), utilizing the histogram prepared in the histogram memory 10, and stores such prepared conversion table in the gradation conversion table 13.

Then, when the image to be converted is read from the frame memory 12 to the image storage processing unit 20, the reading is executed serially through the first gradation conversion table 13 and the second gradation conversion table 14, whereby a flow (d)→(e)→(c)→(b)→(a) in FIG. 2 can be realized and there can be obtained an image of a histogram comparable to that of the standard image fetched in advance.

In the present embodiment, the first gradation conversion table 13 and the second gradation conversion table 14 are separated for the ease of description, but they may also be synthesized into a conversion table, and, in such case, there is employed a single gradation conversion table obtained by synthesizing two gradation conversion tables.

Also in the present embodiment, the image subjected to the gradation process by the operator is adopted as the standard image, but if it is intended to match the output result of the printer 18 with the characteristics of the conventional silver halide-based film, the standard image can also be prepared by digitizing, for example with a film digitizer, a conventional silver halide-based film taken in advance, whereby there can be dispensed with the gradation process to be executed by the operator for obtaining the standard image.

Also in the present embodiment, the histogram is prepared automatically through a hardware process, but such histogram may also be prepared through a software process, either by the controller 5 on the frame memory 12 or by a program on the memory medium 27 at the acquisition of the image data.

In the following there will be explained a second embodiment with reference to FIG. 4.

Figure 4:
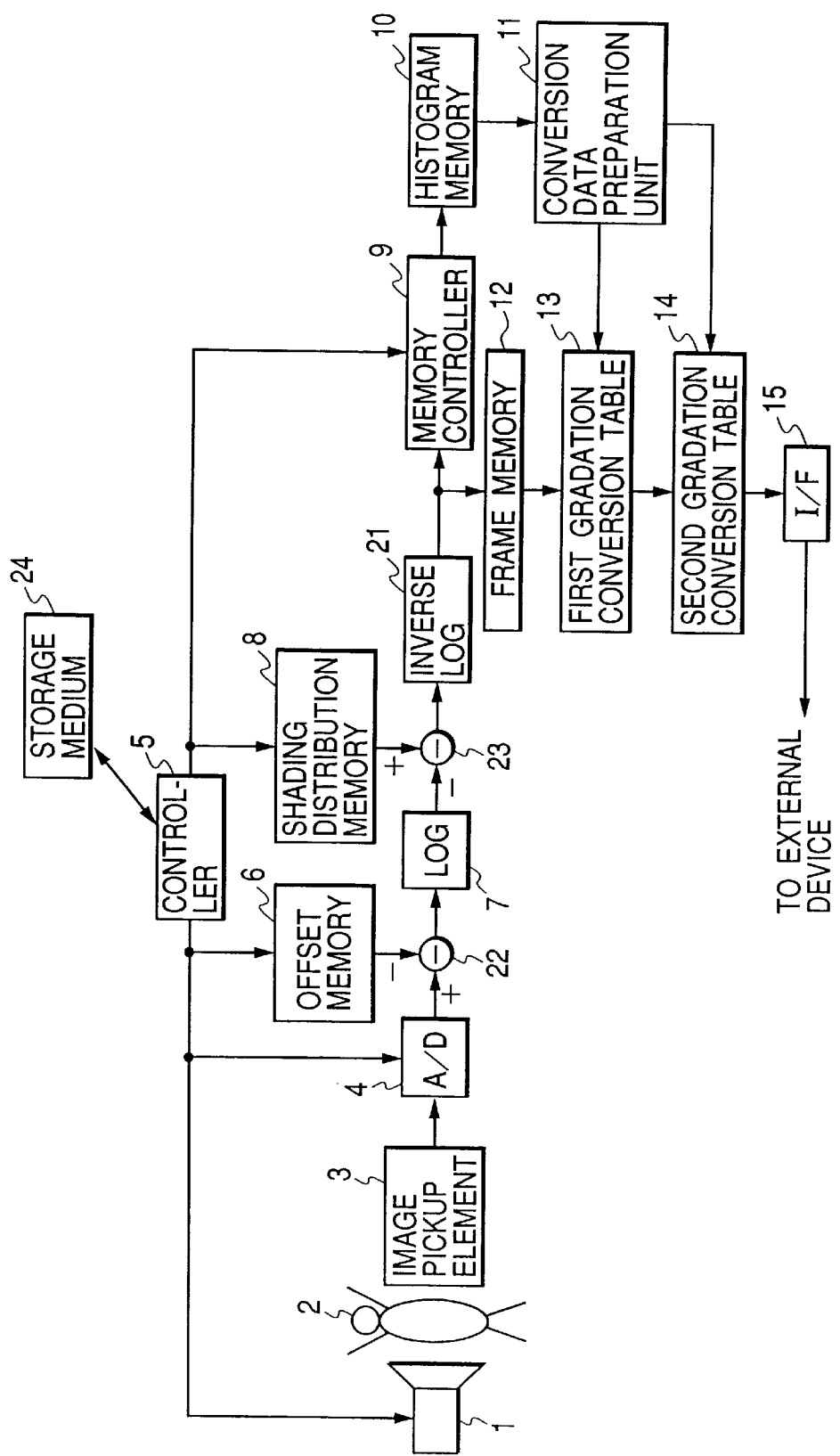
FIG. 4 is a block diagram of a second embodiment of the first invention.

The configuration shown in FIG. 4 is different from that shown in FIG. 3 in that the image storage processing unit 20 is dispensed with and in that the conversion data preparation unit 11 functions differently in writing into the gradation conversion table 13 and in writing into the gradation conversion table 14.

The present embodiment does not employ, as the standard image, an image obtained by image processing or with a digitizer, but employs an image obtained under optimum image taking conditions.

When an image suitable as standard is obtained depending on the object and the image taking conditions, the operator sets such image as the standard image by unrepresented input means. In response, the histogram flattening conversion data preparation unit 11 executes flattening of the histogram according to the equation (5), utilizing the data of the histogram memory 10, then prepares the inverse conversion table therefor and writes it in the gradation conversion table 14.

At the acquisition of an ordinary image, simultaneous with the fetching of each image in the frame memory 12, the conversion data preparation unit 11 prepares the gradation conversion table for histogram flattening according to the equation (5), and writes it in the gradation conversion table 13. Thus the histogram of the ordinary image, outputted from the interface 15 to the external equipment, is automatically converted similar to the histogram of the standard image.

Figure 5:
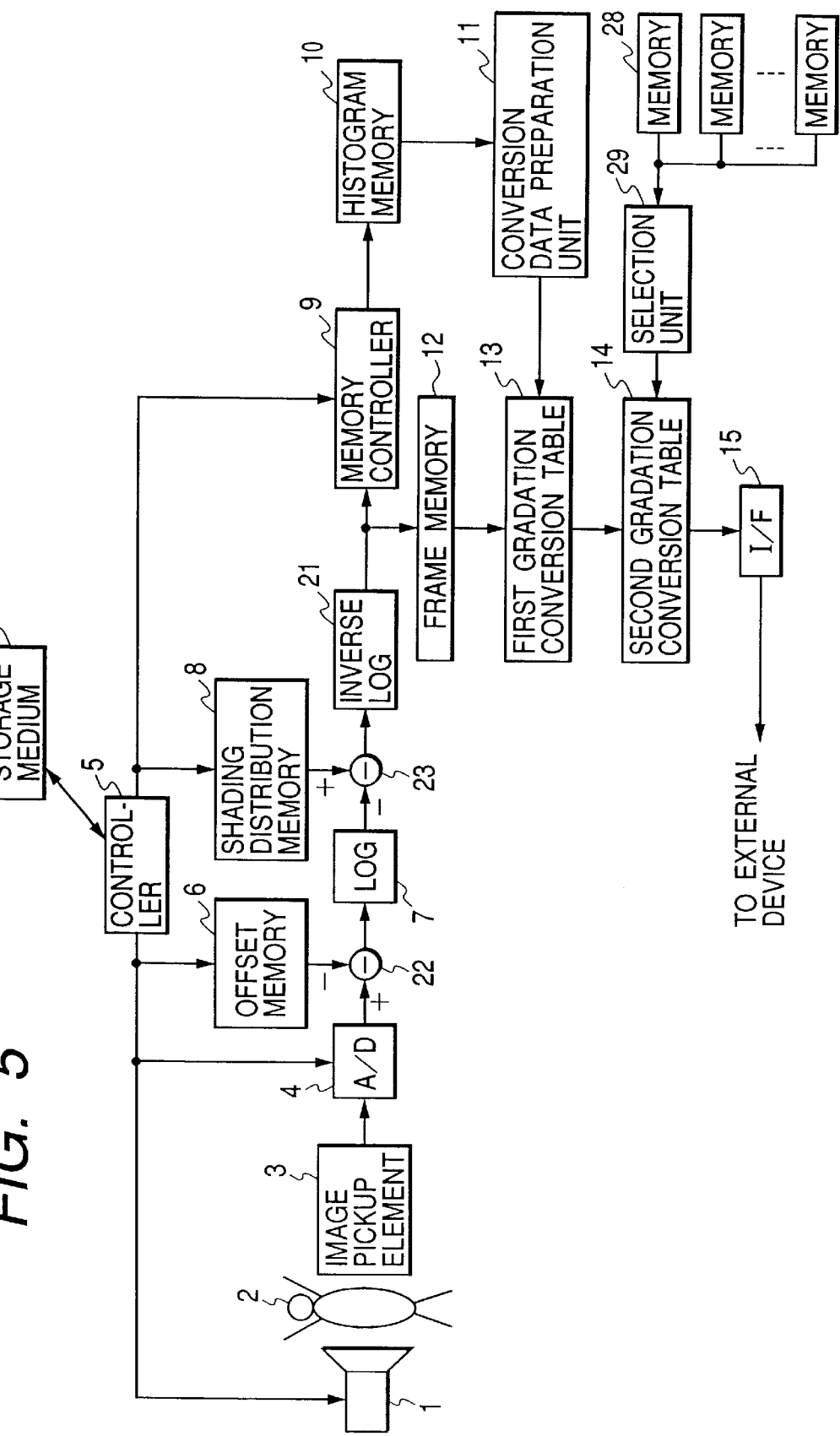
FIG. 5 is a block diagram of a third embodiment of the first invention.

FIG. 5 shows the configuration of a third embodiment, wherein provided are a group of memories 28 for inverse conversion of plural histograms, and a selection unit 29 for selecting such memories for writing into the second gradation conversion table 14. Other parts of the configuration are same as those shown in FIG. 4.

The histogram of the standard image naturally varies in various manners, according to the taken portion of the object, the kind of disease to be described, the taste of the diagnosing radiologist. Histograms considered as standards are acquired in advance, and the inverse conversion tables for the standard histogram flattenings are stored in the plural memories 28.

Prior to the actual image taking, the operator selects a desired histogram flattening inverse table from the memories 28 through the selection unit 29 controlled by unrepresented means. At the acquisition of an ordinary image, simultaneous with the fetching of each image in the frame memory 12, the conversion data preparation unit 11 prepares the gradation conversion table for histogram flattening according to the equation (5), and writes it in the gradation conversion table 13. Thus the histogram of the ordinary image, outputted from the interface 15 to the external equipment, is automatically converted similar to the histogram of the standard image.

As in the first embodiment, similar effects can also be obtained by providing plural standard histograms or inverse histogram flattening gradation conversion tables outside the system and selecting such histograms or tables.

Also the gradation conversion tables for histogram flattening and inverse flattening need not necessarily be separated but there may also be employed a single gradation conversion table, obtained by synthesizing these tables, for obtaining a similar effect.

Also in matching the histogram in the foregoing first to third embodiments, there may be employed the histogram of a specified portion of the image instead of the entire image, for histogram matching.

Figure 6:
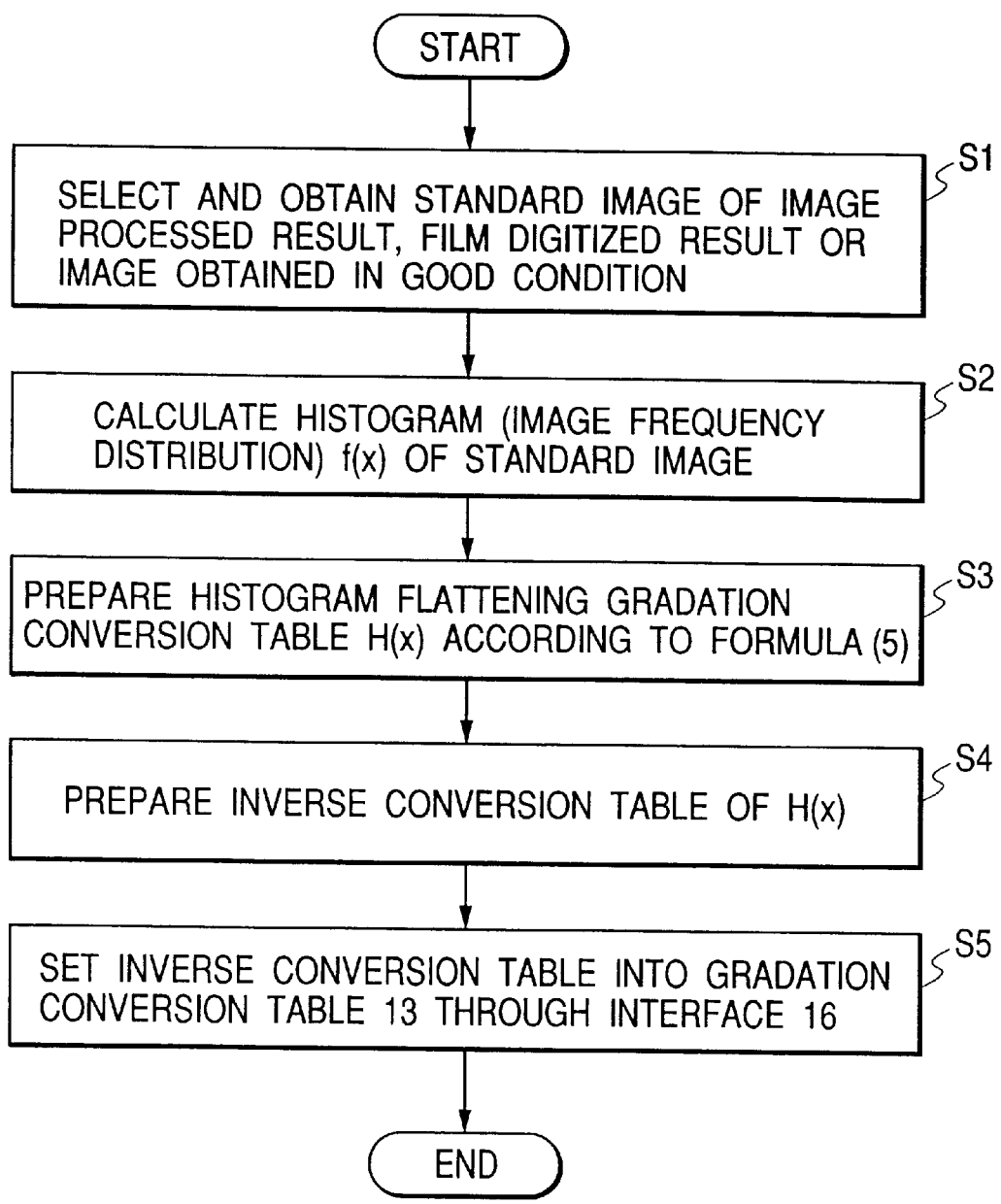
FIG. 6 is a flow chart showing the functions common to the first to third embodiments.

FIG. 6 is a flow chart of a program process of an external filing device common to the foregoing first to third embodiments. Referring to FIG. 6, a step S1 selects a standard image, based on the result of image processing or of film digitizing, or on an image taken under appropriate conditions. Then a step S2 determines the histogram f(x) of the standard image. A step S3 prepares the gradation conversion table H(x) of histogram flattening according to the equation (5). A step S4 prepares an inverse conversion table of H(x), by fitting H(x) with a program of exchanging the address and the data or with an analytical function, and analytically determining an inverse function. Then a step S5 rewrites the gradation conversion table 13 through the interface 16.

In the following there will be explained fourth to sixth embodiments, which are to solve the aforementioned drawbacks and are to realize in a similar manner a gradation process capable of providing, for an arbitrary image, a histogram same as that of the standard image, employing a given image as the standard image and utilizing a fact that the appearance of the image substantially depends on the frequency distribution (histogram) if the taken portion remains same.

At first there will be explained the fourth embodiment.

Figure 7:
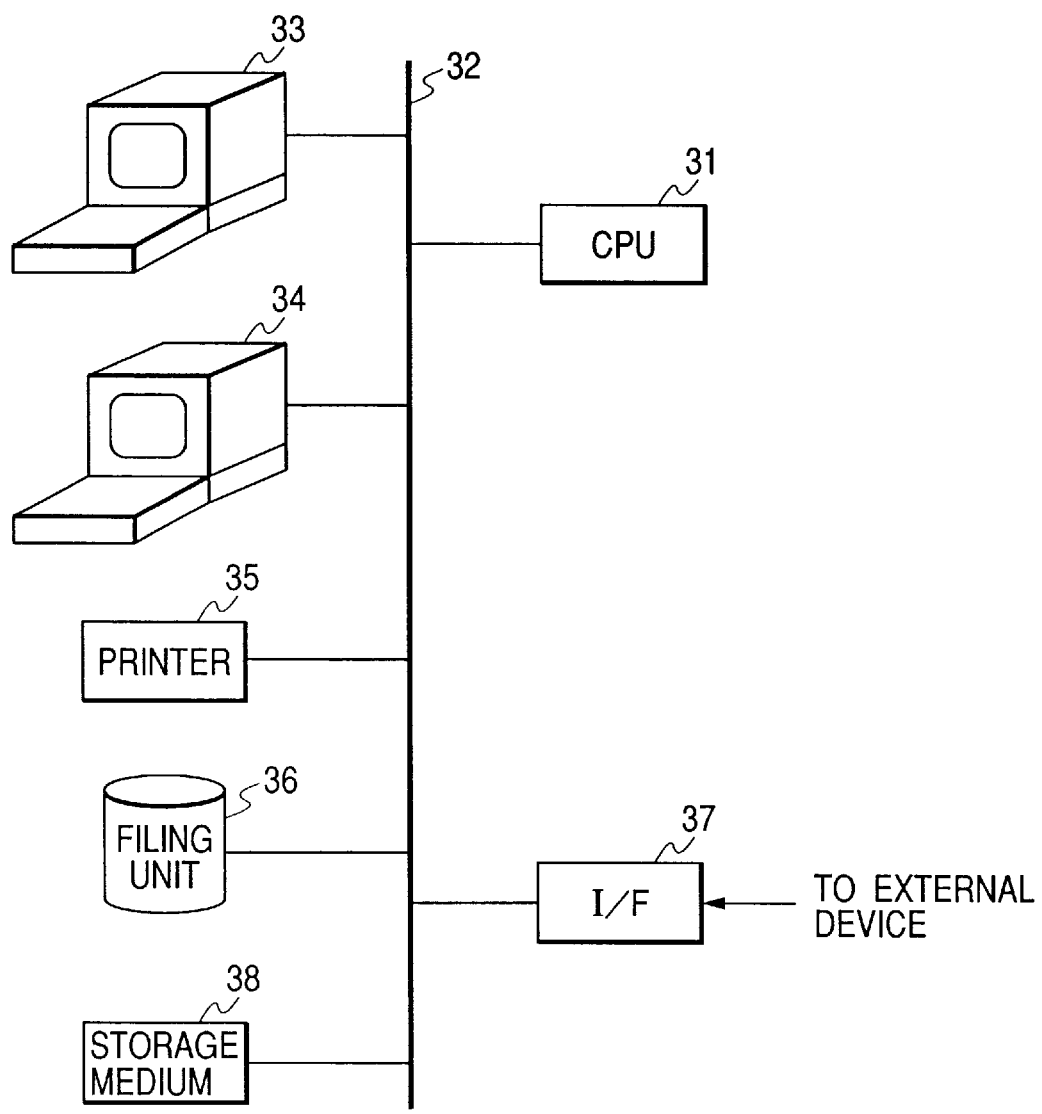
FIG. 7 is a block diagram of a fourth embodiment of the first invention.

FIG. 7 shows the configuration of an image processing apparatus embodying the first invention, wherein provided are a central processing unit (CPU) 31 for controlling the entire apparatus; a bus 32 connecting the internal units; an operation console 33 which is to be operated by the operator under the observation of the image and of which monitor can be used for simple diagnosis; and another operation console 34 with a monitor. The operator can execute comparative investigation, by simultaneously observing the monitors of the two operation consoles 33, 34. The number of monitors is not limited to two but can be made larger. There are also provided a printer 35 for outputting the image for example on a silver halide-based film; an image filing unit 36; and an interface 37 for fetching the image data for example from an external image reading apparatus to the present image processing apparatus.

A memory medium 38 stores a program, according to which the CPU 31 functions. The operations of the present embodiment are all realized by this program. The memory medium 38 can for example be a ROM, a FD, a CD-ROM, a HD, a memory card or a magnetooptical disk.

Figure 8:
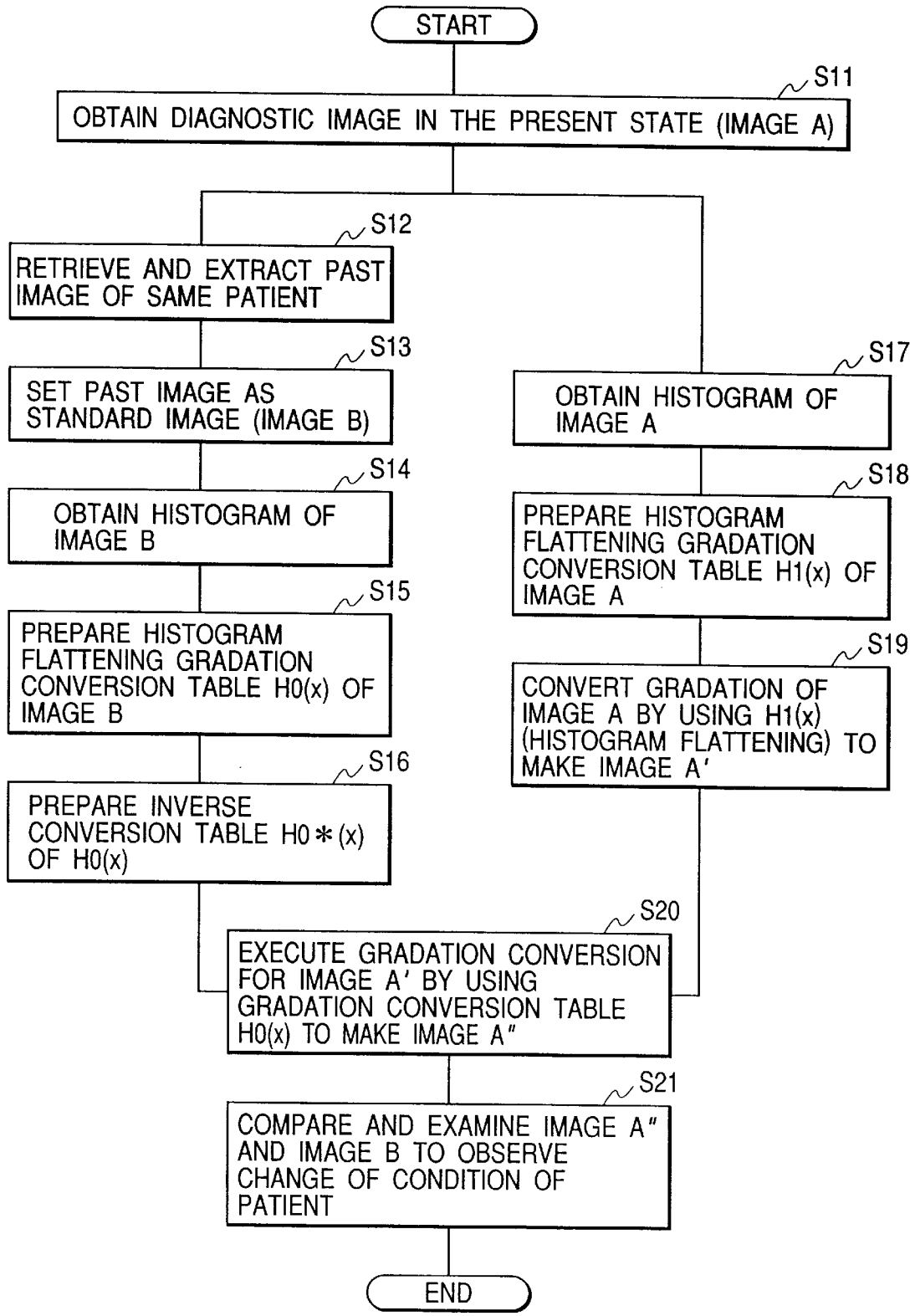
FIG. 8 is a flow chart showing the functions of the fourth embodiment.

The functions of the present apparatus will be explained with reference to FIG. 8. At first a step S11 fetches the diagnostic image (image A) of a patient into the present image processing apparatus. A next step S12 retrieves and extracts a past image of the same patient from the filing unit 36, and a step S13 names such image as an image B. In order to compare the past image and the present image on the above-mentioned two monitors, the gradation characteristics of the images have to be approximately matched.

A next step S14 determines the histogram of the past image B. A step S15 calculates the histogram flattening gradation conversion table $H_0(x)$ (x being pixel value) for the image B. A step S16 calculates the inverse conversion table $H_0^*(x)$ for $H_0(x)$. Such calculation can be achieved by a program process for exchanging the address and the data, but it can also be achieved by fitting the table data to an analytical function and calculating the inverse function of such analytical function.

On the other hand, parallel to the foregoing process, a step S17 determines the histogram of the image A, then a step S18 prepares the gradation conversion table $H_1(x)$ for flattening such histogram, and a step S19 executes the gradation conversion of the current image with $H_1(x)$ (obtained image being called image A').

Then a step S20 executes the gradation conversion of the image A' with the inverse conversion table $H_0^*(x)$ to obtain an image A". The images A" and B have approximately same histograms, so that the operator or the radiologist can compare the past image and the image B to detect the change in the diseased portion or in the disease of the patient.

In the foregoing description, the past image B is taken as the standard image, but the current image A may also be adopted as the standard image. In such case the gradation conversion table for inverse flatting of the histogram of the current image A, and the gradation conversion for the past image B may be conducted by passing the gradation conversion table for histogram flattening and then the above-mentioned gradation conversion table for inverse histogram flattening.

The operator can compare thus obtained images A" and B by recording these images on another medium by the printer 35, or by displaying these images on one or both of the two monitors.

The present invention can also be realized by supplying the system of the apparatus with the memory medium 38 storing the program and by reading and executing the program codes by a computer of the system or the apparatus.

In the following there will be explained a fifth embodiment of the present invention.

Instead of selecting a past image of the same patient as the standard image, it is also possible to match the histogram with that of an image allowing to extract the features of the common disease. If there are plural images empirically known as suitable for extracting specific disease, the histograms of such images can be averaged to derive a standard histogram suitable for extracting such disease.

There is determined the gradation conversion table for inverse flattening of such histogram, and an ordinary image for diagnosis is at first subjected to histogram flattening and then to gradation matching by such inverse flattening gradation conversion table, whereby all the images can be changed to uniform gradation characteristics and the efficiency of diagnosis can be improved.

Instead of obtaining the standard histogram suitable for disease extraction from the actual image, it is also possible to draw an ideal form of the histogram and to prepare the gradation conversion table for inverse flattening of such histogram.

In the following there will be explained a sixth embodiment.

The standard image or the standard histogram is variable depending on the diseased portion, the imaged portion of the human body or the taste of the radiologist, and it is inefficient to calculate such standard image or standard histogram every time. In the present embodiment, therefore, plural gradation conversion tables for inverse flattening of the histogram are stored in the filing system of the image processing apparatus, according to the difference in the diseased portions, in the imaged portions of the human body or in the taste of the radiologist.

The operator selects, through the operation console, one of the plural gradation conversion tables for inverse flattening of the histogram, according to the purpose of use of the image or the imaged portion of the human body. Then a general image is subjected to histogram flattening and then to gradation conversion by thus selected gradation conversion table for inverse flattening of the histogram, whereby the image of desired gradation characteristics can be obtained promptly.

In the foregoing embodiments, there are always executed two gradation conversions, namely the histogram flattening and the inverse histogram flattening to the standard image, but a similar effect can also be achieved by synthesizing the respective gradation conversion tables into a single gradation conversion table.

Also, in any of the histograms described in the foregoing, it is possible to determine and utilize the histogram for a part of the image.

As explained in the foregoing, the first invention enables a gradation conversion capable of converting the histogram of a general image into that of the standard image, thereby, even in case the image taking conditions in the X-ray image reading device are unstable, obtaining an image in always stable manner, particularly obtaining an image matching the output characteristics of the conventional silver halide-based film from a digital X-ray image, through a very simple process.

Also since the first invention enables a gradation conversion capable of converting the histogram of a general image into that of the standard image, it is rendered possible, in case of X-ray diagnosis of the change in the disease of a same patient, to convert the images of any time into images of same characteristics through a very simple method even if the X-ray image taking conditions are different from those used in the past or unstable, thereby improving the efficiency and accuracy of diagnosis. There can also be achieved gradation conversion allowing better extraction of the disease to be confirmed.

In the following there will be explained the principle of a second invention.

In the second invention, an image obtained by energy substraction is subjected to gradation conversion to gradation characteristics similar to those of the original X-ray image, thereby preventing the loss in the efficiency of diagnosis. More specifically, the histogram flattening technology is used to match the histogram of the image obtained by energy subtraction in general manner with the histogram of the original image or that of a standard X-ray image.

A first step of this process consists of preparing a gradation conversion table for flattening of the histogram of the original X-ray images (images before subtraction (or the average of such images)) or that of a standard X-ray image, and preparing an inverse conversion table thereof.

A second step consists of preparing a gradation conversion table for histogram flattening for an image obtained by energy subtraction, and passing the same image through such gradation conversion table thereby effecting gradation conversion. In this stage, the histogram of an arbitrarily selected general image is flattened.

In a final step, the energy subtraction image subjected to the histogram flattening is subjected to gradation conversion with the above-mentioned inverse conversion table for the original X-ray image or for the standard X-ray image.

Through the third-step process described above, the histogram of an arbitrary general image is converted to a shape generally similar to that of the standard image.

The histogram of a digital image is obtained as the frequency distribution of all the pixel values x or a part thereof in an image. If such histogram is represented by $f(x)$, the histogram flattening is a technology of deforming $f(x)$ so as to flatten the density of distribution in general manner. The histogram flattening is executed by passing the image data through a gradation conversion table $H(x)$ represented by the following formula:

$$H(x) = \frac{\sum_{i=M0}^{x} f(i)}{\sum_{i=M0}^{M1} f(i)} (M1 - M0) + M0, \quad M0 \le x \le M1 \quad (6)$$

wherein M0 and M1 are respectively the minimum and maximum values of the digital data, in which the depth (number of bits) of the input digital data is selected same as that of the output digital data (for example in the ordinary 12-bit data, M0=0 and M1=4095). It can be easily estimated that such gradation conversion table H(x) can convert the gradation of the original image with a histogram f(x) to an approximately flat density of distribution.

The above-described first step prepares a histogram flattening gradation conversion table $H_0(x)$ from the histogram $f_0(x)$ of a standard image, utilizing the equation (6), and then prepares an inversion conversion table $H_0^*(x)$. Since $H_0(x)$ is generally not an analytically determined function, the inverse conversion table $H_0^*(x)$ which is an inverse function cannot be determined in an analytical manner, but a conversion table providing an inverse relationship between the input and the output can be easily determined through a simple routine program. Otherwise it is also possible to approximate H(x) with an analytical function (for example by least square method) and to analytically approximate H*(x). The inverse conversion table $H_0^*(x)$ thus determined evidently has a function of converting an image with a flattened histogram into an image having a histogram similar to that of the standard image. This situation is illustrated in FIG. 9.

Figure 9:
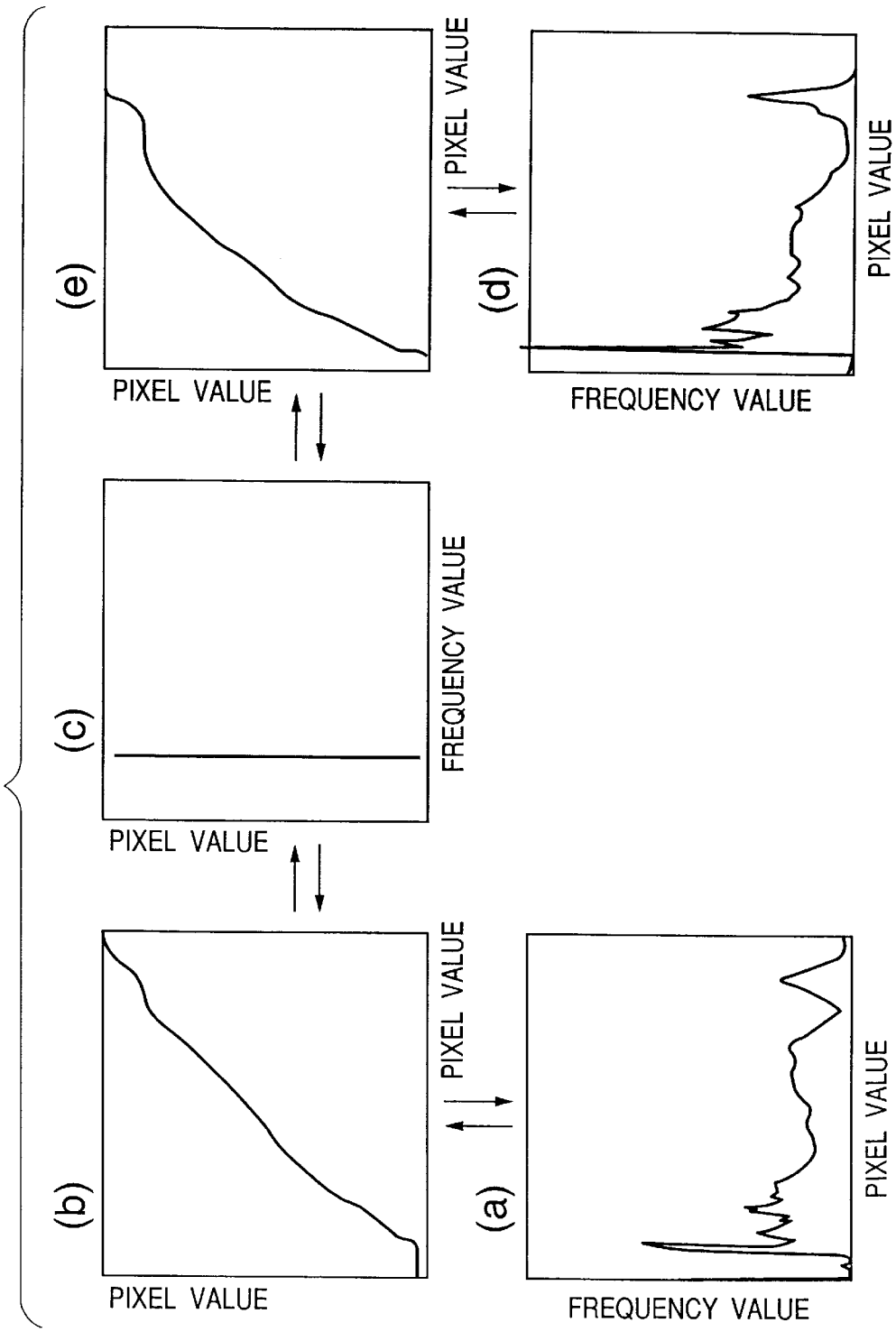
FIG. 9 is a characteristic charts showing the principle of a second invention.

In FIG. 9, (a) indicates the histogram $f_0(x)$ of the original X-ray image or the standard image, with the pixel values in the abscissa and the frequency in the ordinate. In FIG. 9, (b) shows a gradation conversion table $H_0(x)$ for flattening the histogram, in which the abscissa indicates the input and the ordinate indicates the output, while (c) schematically shows a flattened histogram of an output image, obtained by passing the image of the histogram (a) through the conversion table of the input-output characteristics (b).

The flow (a)→(b)→(c) shown in FIG. 9 can be traced in the inverse order so that a conversion (c)→(b)→(a) is also possible (though such conversion is not completely reversible since some information is inevitably lost in the conversion with the table of a limited number of gradation level). In such inverse conversion, (b) corresponds to the inverse function $H_0^*(x)$ in which the ordinate indicates the input and the abscissa indicates the output.

In the above-described second step, an energy subtraction image of a histogram different from that of the original X-ray image or the standard image is subjected to the flattening of histogram also according to the equation (6). More specifically, this step prepares a histogram flattening gradation conversion table $H_1(x)$ from the histogram $f_1(x)$ of the energy subtraction image, utilizing the equation (6), as shown in FIG. 9.

In FIG. 9, (d) indicates the histogram $f_1(x)$, with the pixel values in the abscissa and the frequency in the ordinate. In FIG. 9, (e) shows a histogram flattening gradation conversion table $H_1(x)$, in which the abscissa indicates the input and the ordinate indicates the output, while (c) shows a histogram flattened as a result.

In the final step mentioned above, as the image of the flattened histogram (c) is converted through the table $H_0^*(x)$ shown in (b), it will be easily understood that an image having the standard histogram (a) can be obtained as the result of such conversion.

In the foregoing explanation, it is to be noted that, since the image consists of discrete digital values, the histogram after passing the histogram flattening table is not made completely flat but only shows an approximately constant density in general sense, so that the histogram of the final image obtained through the above-described three steps does not completely coincide with the histogram of the standard image. However, the images will be recognized, by the human eyes, to have substantially coinciding characteristics if the histograms mutually match in general sense.

This process also functions effectively not only for the energy subtracted image but also a subtraction image obtained with the ordinary shadowing agent (difference between presence and absence of the shadowing agent, so-called time subtraction).

In the following there will be explained embodiments of the second invention based on the above-described principle.

Figure 1:
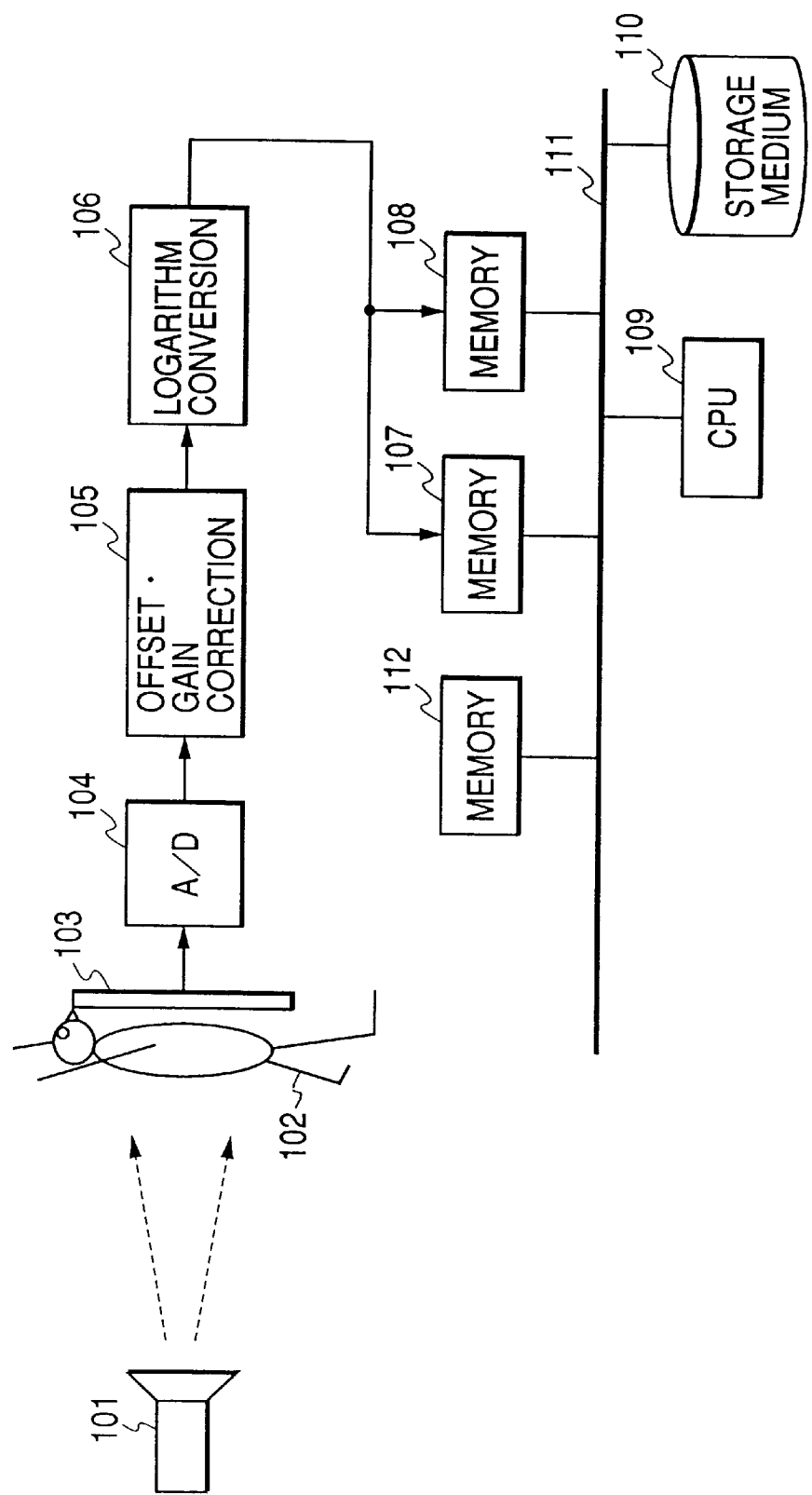
FIG. 1 is a block diagram of a conventional energy subtraction apparatus.

FIG. 10 is a block diagram of an embodiment of the energy subtraction apparatus, constituting an image processing apparatus embodying the second invention, wherein components 101–112 are similar to those in FIG. 1 and will not therefore be explained further. In FIG. 10 there are additionally provided a memory 113 for storing a final image, obtained by the gradation conversion of the energy subtraction image stored in the memory 112; and look-up tables (LUT) 114, 115 for data conversion, which are used for the gradation conversion.

In the following there will be explained the functions of a first embodiment.

The process up to the storage of the energy subtraction image in the memory 112 is same as explained in the description of the prior art. In the following there will be explained the subsequent gradation conversion, with reference to a flow chart shown in FIG. 11.

An initial step S101 prepares LUT data for histogram flattening according to the equation (6), based on the histogram data of the energy subtraction image stored in the memory 112, and stores such LUT data in the LUT 114.

Then there is prepared LUT data for histogram flattening according to the equation (6), from the histogram data of an original image in the memory 107, 108 or an image obtained by averaging these images, and an inverse function thereof is calculated and stored in the LUT 115 (step S102).

In the final stage, the image data obtained by energy subtraction are read in succession from the memory 112, then subjected to a numerical conversion by the LUT 114, and the converted data are further subjected to a numerical conversion by the LUT 115. Thus converted image data are in succession stored, as the gradation converted image, in the memory 113, and this process is executed for all the data in the memory 112 (step S103 to S106).

Through the operations described above, the subtraction image obtained in the memory 113 are converted to stable gradation characteristics comparable to those of the conventional X-ray image.

In the present embodiment, the LUT 114 and the LUT 115 are separated, but a similar effect can be obtained by synthesizing these numerical conversions into a single LUT.

Also the steps S101, S102 in FIG. 11 may be executed in either order.

In the following there will be explained a second embodiment.

In the first embodiment, the gradation is matched with that of the original image, but the gradation characteristics need not be particularly matched with those of the original image but can be matched with those of a standard X-ray image, or those ideal for observing the energy subtraction image, or those ideal for the imaged portion of the human body.

The present embodiment is to change the gradation characteristics to a desired shape, thereby obtaining an energy subtraction image with stable gradation characteristics independent of the image taking conditions.

More specifically, in the step S102 in FIG. 11, the LUT data of the inverse flattening function to be stored in the LUT 115 are prepared from desired histogram data.

Also this step S102 can be dispensed with from the second time, if the desired histogram data remain same.

In the following there will be explained a third embodiment.

The present embodiment is intended for stabilizing the gradation characteristics not only of the energy subtraction image but also of other subtraction methods such as so-called time subtraction image, obtained from the difference before and after the administration of the shadowing agent.

In these subtraction methods, a similar histogram conversion is also possible for an image which is obtained, instead of using two image taking conditions, by suitable additions or subtractions on a larger number of images, thereby erasing or enhancing a particular portion or a particular internal organ.

The memory medium 110 constituting the second invention stores a program including the process shown in FIG. 4, and an effect comparable to that of the second invention can be obtained by utilizing such memory medium 110 on another system, apparatus or computer. The memory medium 110 can be composed for example of a semiconductor memory, an optical disk, a magnetooptical disk or a magnetic medium.

As explained in the foregoing, the second invention allows conversion of the histogram characteristics of an energy subtraction image or other subtraction images to a desired distribution, thereby providing an output image with constantly stable gradation characteristics, regardless of the image taking conditions.

What is claimed is:

1. An image processing apparatus capable of varying the gradation characteristics of an image, comprising:
    (a) histogram distribution characteristics detection means for inputting an image signal and detecting the histogram distribution characteristics of pixel values constituting an image represented by the inputted image signal; and
    (b) histogram distribution characteristics conversion means for converting the histogram characteristics detected by said histogram distribution characteristics detection means into arbitrary histogram distribution characteristics, wherein said histogram distribution characteristics conversion means includes first gradation conversion means having gradation conversion characteristics for flattening the histogram distribution characteristics detected by said histogram distribution characteristics detection means; and second gradation conversion means having inverse gradation conversion characteristics to the gradation conversion characteristics for flattening the histogram distribution characteristics of the pixel values constituting an image represented by a reference image signal; and said first and second gradation conversion means are so arranged that the gradation of an image represented by an inputted arbitrary image signal is converted by said first gradation conversion means and then further converted by said second gradation conversion means.

2. An apparatus according to claim 1, wherein the image represented by said reference image signal is a standard image prepared in advance and having desired gradation characteristics.

3. An apparatus according to claim 1, further comprising display means for visually displaying an image represented by said reference image signal and an image of which histogram distribution characteristics are converted by said histogram distribution characteristics conversion means.

4. An apparatus according to claim 1, wherein the image represented by said reference image signal and the image represented by the image signal inputted into said histogram distribution characteristics detection means are radiation recording images obtained by irradiating a same portion of a same object or a same portion of objects of a same kind with a radiation and taking the image of the transmitted radiation.

5. An image processing apparatus capable of varying the gradation characteristics of an image, comprising:
    (a) histogram distribution characteristics detection means for inputting an image signal and detecting the histogram distribution characteristics of pixel values constituting an image represented by the inputted image signal; and
    (b) histogram distribution characteristics conversion means for converting the histogram characteristics detected by said histogram distribution characteristics detection means into arbitrary histogram distribution characteristics, wherein said histogram distribution characteristics conversion means includes first conversion memory table preparation means for preparing a first conversion memory table by preparing conversion data of gradation conversion characteristics for flattening the histogram distribution characteristics detected by said histogram distribution characteristics detection means and storing thus prepared conversion data in a memory table; histogram distribution characteristics generation means for generating the histogram distribution characteristics of pixel values constituting an image represented by the reference image signal; and second conversion memory table preparation means for preparing a second conversion memory table by preparing conversion data of gradation conversion characteristics inverse to the gradation conversion characteristics for flattening the histogram distribution characteristics generated in said histogram distribution characteristics generation means and storing thus prepared conversion data as memory table; and said means are so arranged that the gradation of an image represented by an inputted arbitrary image signal is converted by the first conversion memory table prepared by said first conversion memory table preparation means and further converted by the second conversion memory table prepared by said second conversion memory table preparation means.

6. An apparatus according to claim 5, wherein said histogram distribution characteristics detection means is adapted to detect the histogram characteristics from the pixel values of at least a part of the pixels constituting the image represented by the inputted image signal, and said histogram distribution characteristics generation means is adapted to generate the histogram characteristics from the pixel values of at least a part of the pixels constituting the reference image represented by the reference image signal.

7. An image processing apparatus capable of varying the gradation characteristics of an image, comprising:
    (a) histogram distribution characteristics detection means for inputting an image signal and detecting the histogram distribution characteristics of pixel values constituting an image represented by the inputted image signal; and (b) histogram distribution characteristics conversion means for converting the histogram characteristics detected by said histogram distribution characteristics detection means into arbitrary histogram distribution characteristics, wherein said histogram distribution characteristics conversion means includes first gradation conversion means adapted to prepare conversion data having gradation conversion characteristics for flattening the histogram distribution characteristics detected by said histogram distribution characteristics detection means, to convert, according to said prepared conversion data, the gradation of an image represented by an arbitrary image signal inputted into said histogram distribution characteristics detection means and to output the image with thus converted gradation; and second gradation conversion means adapted to select one of plural conversion memory tables respectively containing conversion data of gradation conversion characteristics inverse to the gradation conversion characteristics for flattening the histogram distribution characteristics of the pixel values constituting an image represented by an arbitrary image signal, to convert, according to the conversion data contained in the selected conversion memory table, the gradation of the image represented by the image signal outputted from said first gradation conversion means and to output the image with thus converted gradation.

8. An image processing method capable of varying the gradation characteristics of an image, comprising:

(a) a histogram distribution characteristics detection step of detecting the histogram distribution characteristics of pixel values constituting an image represented by an inputted image signal; and (b) a histogram distribution characteristics conversion step of converting the histogram characteristics detected by said histogram distribution characteristics detection step into arbitrary histogram distribution characteristics, wherein said histogram distribution characteristics conversion step includes a first gradation conversion step having gradation conversion characteristics for flattening the histogram distribution characteristics detected by said histogram distribution characteristics detection step; and a second gradation conversion step having inverse gradation conversion characteristics to the gradation conversion characteristics for flattening the histogram distribution characteristics of the pixel values constituting an image represented by a reference image signal; and said first and second gradation conversion steps are so arranged that the gradation of an image represented by an arbitrary image signal is converted by said first gradation conversion step and then further converted by said second gradation conversion step.

9. A method according to claim 8, wherein the image represented by said reference image signal is a standard image prepared in advance and having desired gradation characteristics.

10. A method according to claim 8, further comprising a display step of visually displaying an image represented by said reference image signal and an image of which histogram distribution characteristics are converted by said histogram distribution characteristics conversion step.

11. A method according to claim 8, wherein the image represented by said reference image signal and the image processed in said histogram distribution characteristics detection step are radiation recording images obtained by irradiating a same portion of a same object or a same portion of objects of a same kind with a radiation and taking the image of the transmitted radiation.

12. An image processing apparatus for executing a gradation correction corresponding to a gradation characteristic of a reference image, on an input image, comprising:

(a) first gradation correction condition calculating means for calculating a first gradation correction condition to obtain a histogram distribution of the reference image from an image having a flat histogram distribution;

(b) means for calculating a histogram distribution of the input image;

(c) second gradation correction condition calculating means for calculating a second gradation correction condition for changing the histogram distribution of the input image to a flat histogram distribution; and (d) gradation correction means for correcting the gradation of the input image using the second gradation correction condition and correcting the gradation of the input image using the first gradation correction condition.

13. An apparatus according to claim 12, wherein said first gradation correction condition calculating means includes:

(i) third gradation correction condition calculating means for calculating a third gradation correction condition for changing the histogram distribution of the reference image to a flat histogram distribution; and (ii) means for calculating an inverse gradation correction condition to execute inverse transform of the third gradation correction, wherein the calculated inverse gradation correction condition is set as first gradation correction condition.

14. An apparatus according to claim 12, wherein said input image is a medical image, and wherein said reference image indicates a same part with the input image.

15. An apparatus according to claim 12, wherein the input image is a radiation image.

16. An apparatus according to claim 12, wherein said first gradation correction condition calculating means includes:

(i) maintaining means for maintaining plural first gradation correction conditions corresponding to each of plural different reference images;

(ii) selecting means for selecting one of the maintained plural first gradation correction conditions.

17. An apparatus according to claim 12, wherein said gradation correction means corrects the gradation of the input image using gradation correction condition obtained by synthesizing the second gradation correction condition and the first gradation correction condition.

18. A method of executing a gradation correction corresponding to a gradation characteristic of a reference image, on an input image, comprising:

(a) calculating a first gradation correction condition to obtain a histogram distribution of the reference image from an image having a flat histogram distribution;

(b) calculating a histogram distribution of the input image;

(c) calculating a second gradation correction condition for changing the histogram distribution of the input image to a flat histogram distribution; and (d) correcting the gradation of the input image using the second gradation correction condition and correcting the gradation of the input image using the first gradation correction condition.

19. A computer readable-medium comprising code that, when executed, causes a computer to carry out the steps of:
  (a) calculating a first gradation correction condition to obtain a histogram distribution of the reference image from an image having a flat histogram distribution;
  (b) calculating a histogram distribution of the input image;
  (c) calculating a second gradation correction condition for changing the histogram distribution of the input image to a flat histogram distribution; and
  (d) correcting the gradation of the input image using the second gradation correction condition and correcting the gradation of the input image using the first gradation correction condition.

20. An apparatus according to claim 12, wherein the input image is obtained from plural images obtained in different conditions.

21. An apparatus according to claim 20, wherein the input image is an energy subtraction image obtained from plural images obtained by photographing a same subject by changing X ray energy distribution.

22. An apparatus according to claim 20, wherein the input image is a time subtraction image obtained by difference of time change of a subject.

23. An method according to claim 18, wherein the input image is obtained from plural images obtained in different conditions.

24. An method according to claim 18, wherein the input image is an energy subtraction image obtained from plural images obtained by photographing a same subject by changing X ray energy distribution.

25. An method according to claim 18, wherein the input image is a time subtraction image obtained by difference of time change of a subject.

* * * * *